United States Patent
Bedekar (10) Patent No.: US 11,357,076 B2
(45) Date of Patent: Jun. 7, 2022

(54) RADIO RESOURCE PARAMETER CONFIGURATION

(71) Applicant: NOKIA SOLUTIONS AND NETWORKS OY, Espoo (FI)

(72) Inventor: Anand Bedekar, Glenview, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/339,066

(22) Filed: Jun. 4, 2021

(65) Prior Publication Data

US 2021/0400765 A1 Dec. 23, 2021

(30) Foreign Application Priority Data

Jun. 22, 2020 (FI) ...................................... 20205651

(51) Int. Cl.
*H04W 76/38* (2018.01)
*H04W 76/11* (2018.01)
*H04W 24/10* (2009.01)
*H04W 76/27* (2018.01)

(52) U.S. Cl.
CPC .......... *H04W 76/38* (2018.02); *H04W 24/10* (2013.01); *H04W 76/11* (2018.02); *H04W 76/27* (2018.02)

(58) Field of Classification Search
CPC ..... H04W 76/38; H04W 76/11; H04W 76/27; H04W 24/10
See application file for complete search history.

(56) References Cited

U.S. PATENT DOCUMENTS

| | | | |
|---|---|---|---|
| 2013/0070723 A1 | 3/2013 | Yie et al. | |
| 2015/0148024 A1* | 5/2015 | Jiao ...................... | H04W 8/205 455/418 |
| 2016/0036618 A1* | 2/2016 | Einhaus ............... | H04L 1/0029 370/329 |
| 2016/0234877 A1 | 8/2016 | Bangolae et al. | |
| 2017/0094711 A1* | 3/2017 | Hu .................... | H04W 74/0833 |
| 2019/0059119 A1 | 2/2019 | Hapsari et al. | |
| 2019/0215890 A1* | 7/2019 | Choi .................... | H04W 76/20 |
| 2019/0350031 A1 | 11/2019 | Bedekar | |

(Continued)

OTHER PUBLICATIONS

Combined Search and Examination Report under Sections 17 and 18(3) dated Jul. 12, 2021 corresponding to GB Application No. GB2108507.1.

(Continued)

*Primary Examiner* — Jamal Javaid
*Assistant Examiner* — Thad N Defauw
(74) *Attorney, Agent, or Firm* — Squire Patton Boggs (US) LLP (57) ABSTRACT

This document discloses a solution for configuring a radio resource control connection. According to an aspect, a method comprises: storing, in a database, an identifier of a terminal device and a first set of parameters of a first radio resource control connection of a terminal device; retrieving, from the database by using the identifier after the first radio resource control connection has been terminated, the parameters of the first radio resource control connection; and configuring, on the basis of the retrieved parameters of the first radio resource control connection, at least one operational parameter of a second radio resource control connection of the terminal device identified by the identifier.

12 Claims, 6 Drawing Sheets

(56) References Cited

U.S. PATENT DOCUMENTS

2020/0028745 A1   1/2020   Parkvall et al.
2020/0045760 A1   2/2020   Adjakple et al.

OTHER PUBLICATIONS

3GPP TS 36.300 V16.0.0 (Dec. 2019), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, XP051860576.
Office Action dated Sep. 29, 2020 corresponding to Finnish Patent Application No. 20205651.
Finnish Search Report dated Sep. 29, 2020 corresponding to Finnish Patent Application No. 20205651.
Communication of Acceptance under section 29a of Patents Decree dated Jan. 29, 2021 corresponding to Finnish Patent Application No. 20205651.
3GPP TS 36.331 V16.0.0 (Mar. 2020), Technical Specification, 3rd Generation Partnership Project; Technical Specification Group Radio Access Network; Evolved Universal Terrestrial Radio Access (E-UTRA); Radio Resource Control (RRC); Protocol specification (Release 16), Apr. 6, 2020.
German Office Action dated Jul. 12, 2021 corresponding to German Patent Application No. 10-2021-114298.9.
Office Action dated Feb. 11, 2022 corresponding to German Patent Application No. 102021114298.9, with English translation thereof.

* cited by examiner

RADIO RESOURCE PARAMETER CONFIGURATION

FIELD

Various embodiments described herein relate to the field of wireless communications and, particularly, to configuring one or more parameters of a radio resource control connection in a wireless network, e.g. a cellular communication system.

BACKGROUND

Radio access networks of cellular communication systems are constantly developed in order to improve capacity, speed, and efficiency. Machine learning techniques have also been incorporated to improve the performance of the radio access networks.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided a system comprising at least one processor and at least one memory including computer program code, wherein the at least one memory and computer program code are configured, with the at least one processor, to cause the apparatus to perform the following: storing, in a database, an identifier of a terminal device and a first set of parameters of a first radio resource control connection of a terminal device; retrieving, from the database by using the identifier after the first radio resource control connection has been terminated, the parameters of the first radio resource control connection; and configuring, on the basis of the retrieved parameters of the first radio resource control connection, at least one operational parameter of a second radio resource control connection of the terminal device identified by the identifier.

In an embodiment, the identifier of the terminal device is a persistent identifier maintained across at least the first radio resource control connection and the second radio resource control connection in the database.

In an embodiment, the first set of parameters comprises at least one measured parameter of the first radio resource control connection.

In an embodiment, the identifier has an expiry time, and wherein the at least one memory and computer program code are configured, with the at least one processor, to cause the apparatus to discard the identifier and the first set of parameters upon expiry of the identifier.

In an embodiment, the at least one memory and computer program code are configured, with the at least one processor, to cause the apparatus to store the database in a radio access network of a cellular communication system.

In an embodiment, the at least one memory and computer program code are configured, with the at least one processor, to cause the apparatus to: store a default mapping between values of an operational parameter of the at least one operational parameter and conditions of a radio resource control connection; and change, on the basis of the first set of parameters, the default mapping for the second radio resource control connection, wherein the change causes the mapping to be unique to the terminal device amongst a set of terminal devices served by an access node.

In an embodiment, the at least one memory and computer program code are configured, with the at least one processor, to cause the apparatus to: acquire at least one of a subscriber identifier and an equipment identifier of the terminal device in connection with the first radio resource control connection, transmit a request message to an identifier allocator, the request message comprising the at least one of the subscriber identifier and the equipment identifier; receive, from the identifier allocator, a response message comprising the identifier of the terminal device; and store, during the first radio resource control connection, measurement data in the database by using the identifier.

In an embodiment, the at least one memory and computer program code are configured, with the at least one processor, to cause the apparatus to: acquire the at least one of the subscriber identifier and the equipment identifier of the terminal device in connection with second first radio resource control connection, transmit a further request message to the identifier allocator, the further request message comprising the at least one of the subscriber identifier and the equipment identifier; receive, from the identifier allocator, a further response message comprising the identifier of the terminal device; and store, during the second radio resource control connection, measurement data in the database by using the identifier.

According to an aspect, there is provided a method comprising: storing, in a database, an identifier of a terminal device and a first set of parameters of a first radio resource control connection of a terminal device; retrieving, by a network element from the database by using the identifier after the first radio resource control connection has been terminated, the parameters of the first radio resource control connection; and configuring, by the network element on the basis of the retrieved parameters of the first radio resource control connection, at least one operational parameter of a second radio resource control connection of the terminal device identified by the identifier.

In an embodiment, the identifier has an expiry time, and wherein the at least one memory and computer program code are configured, with the at least one processor, to cause the apparatus to discard the identifier and the first set of parameters upon expiry of the identifier.

In an embodiment, the database is stored in a radio access network of a cellular communication system.

In an embodiment, the method further comprises: storing a default mapping between values of an operational parameter of the at least one operational parameter and conditions of a radio resource control connection; and changing, on the basis of the first set of parameters, the default mapping for the second radio resource control connection, wherein the change causes the mapping to be unique to the terminal device amongst a set of terminal devices served by an access node.

In an embodiment, the method further comprises: acquiring at least one of a subscriber identifier and an equipment identifier of the terminal device in connection with the first radio resource control connection, transmitting a request message to an identifier allocator, the request message comprising the at least one of the subscriber identifier and the equipment identifier; receiving, from the identifier allocator, a response message comprising the identifier of the terminal device; and storing, during the first radio resource control connection, measurement data in the database by using the identifier.

In an embodiment, the at least one of the subscriber identifier and the equipment identifier of the terminal device is acquired in connection with second first radio resource control connection, and the method further comprises: transmitting a further request message to the identifier allocator, the further request message comprising the at least one of the subscriber identifier and the equipment identifier; receiving, from the identifier allocator, a further response message comprising the identifier of the terminal device; and storing, during the second radio resource control connection, measurement data in the database by using the identifier.

According to an aspect, there is provided a computer program product embodied on a computer-readable medium and comprising a computer program code readable by a computer, wherein the computer program code configures the computer to carry out a computer process comprising: storing, in a database, an identifier of a terminal device and a first set of parameters of a first radio resource control connection of a terminal device; retrieving, from the database by using the identifier after the first radio resource control connection has been terminated, the parameters of the first radio resource control connection; and configuring, on the basis of the retrieved parameters of the first radio resource control connection, at least one operational parameter of a second radio resource control connection of the terminal device identified by the identifier.

LIST OF DRAWINGS

Embodiments are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
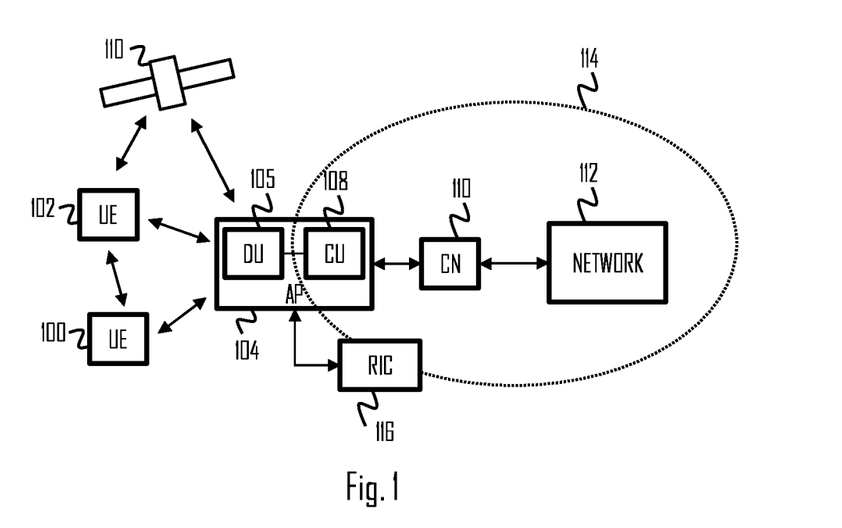
FIG. 1 illustrates a wireless communication scenario to which some embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 110 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network. The access node or e/gNodeB 104 also may support a connection or interface towards a Radio Intelligent Controller (RIC) 116, which may perform some of the functions and optimizations needed for ensuring efficient operation of the access node or radio access network (RAN). In some embodiments, the RIC may embedded inside the access node 104 (in which case the interface towards the RIC is internal to the AP 104), while in other embodiments, the RIC may be a separate network element.

The terminal device 100, 102 is known to connect to the radio access network (RAN) via one or more access nodes 104 over radio resource control (RRC) connections. When needing to transfer data or when receiving a voice call, a RRC connection is established to transfer the data or to connect the voice call. Such RRC connections may be established numerous times during a day, for example. When the RRC connection is established, the terminal device is assigned with a temporary identifier that is used to identify the terminal device during the RRC connection. For example, the temporary identifier may be a C-RNTI (Cell Radio Network Temporary Identifier). The RRC connection is typically configured with a set of operational parameters that guide the RAN's decision processes and actions related to the RRC connection, for example for deciding transmission attributes, or for radio resource management, or for mobility-related actions. The operational parameters may include one or more thresholds, limits or initial values to be used for various internal decision variables used by the RAN. For example, the operational parameters may include an initial modulation and coding scheme for downlink or uplink transmissions, a maximum allowed rank for multiple-input/multiple-output (MIMO) transmissions (uplink and/or downlink), initial value/minimum allowed value/maximum allowed value of an offset that the RAN applies to a channel quality indicator (CQI) reported by the terminal device when deciding transmission parameters such as modulation and coding schemes (MCS) or control channel elements (CCE), a maximum number of hybrid automatic repeat request (HARQ) processes allowed to be simultaneously used for the terminal device, etc. During the RRC connection, the RAN may gather various contextual data or parameters related to the behaviour and performance of the terminal device, including measurements or observations or characteristics or other experiences, or internal RAN variable values related to the RRC conditions, such as those related to the terminal device's channel conditions or performance. These parameters may include for example measurements or other indications reported by the terminal device to the RAN, including reference signal received power (RSRP), channel state information (CSI) including channel quality indicators (CQI), rank indicator (RI), precoding matrix indicator (PMI), or hybrid ARQ positive/negative acknowledgments (HARQ ack/nack) for uplink and/or downlink transmissions, and the like. The parameters may also include measurements or observations made by the RAN, including received signal strength measurements, discontinuous transmission (DTX) indications, sounding reference signal (SRS) measurements, etc. The parameters may include performance-related metrics for the RRC connection, such as error rate, throughput, etc. The parameters may also include traffic-related information such as latency, burstiness, arrival rate, and the like. When the RRC connection is terminated, the temporary identifier is conventionally released. Similarly, all contextual data related to the RRC connection is deleted. When a new RRC connection is established for the terminal device, the contextual data including configuration of operational parameters of the RRC connection is generated from a scratch.

Figure 2:
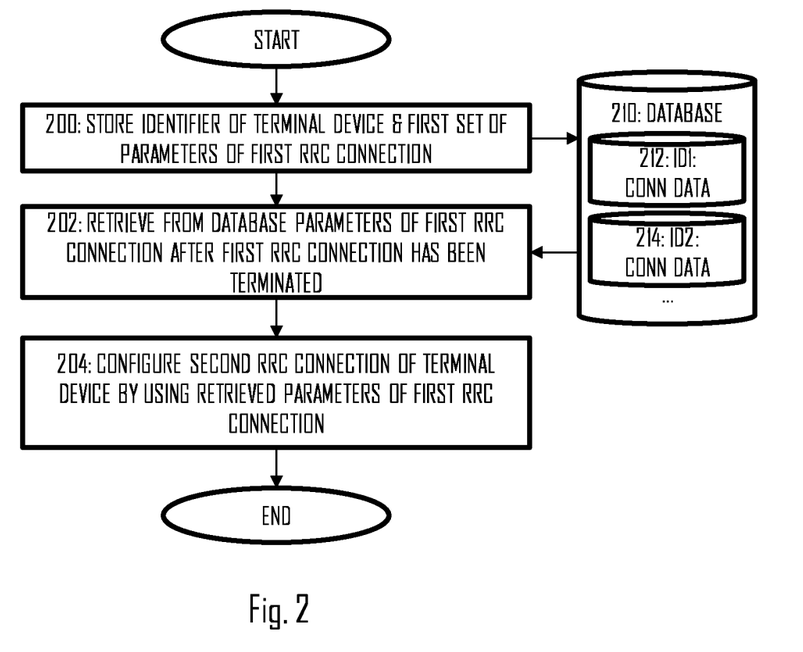
FIG. 2 illustrates an embodiment of a process for configuring a radio resource control connection of a terminal device.

FIG. 2 illustrates a procedure for configuring a RRC connection of a terminal device, e.g. the terminal device 100 or 102. The procedure may be carried out in one or more network elements of the RAN and/or the core network 110 or at a Radio Intelligent Controller (RIC). Referring to FIG. 2, the process comprises: storing (block 200), in a database 210, an identifier of a terminal device and a first set of parameters of a first radio resource control connection of a terminal device; retrieving (block 202), from the database by using the identifier after the first radio resource control connection has been terminated, the parameters of the first radio resource control connection; and configuring (block 204), on the basis of the retrieved parameters of the first radio resource control connection, at least one operational parameter of a second radio resource control connection of the terminal device identified by the identifier.

As illustrated in FIG. 2, the database 210 may store a record 212 for the terminal device, wherein the record is identified with the identifier. A similar record 214 may be stored for other terminal devices served by the same access node, the same RAN, etc.

In an embodiment, the identifier of the terminal device is a persistent identifier maintained across at least the first radio resource control connection and the second radio resource control connection of the terminal device in the database. That is, the identifier, associated with the first radio resource control connection of the terminal device, may be maintained even after the first radio resource control connection has been terminated, and may be associated with a second (subsequent) radio resource control connection of the terminal device. As the identifier may be associated one or more radio resource control connections by the same terminal device, the identifier may be used to identify the parameters of one or more radio resource control connections by the terminal device and/or store and retrieve the corresponding records stored in the database 210. The identifier may be unique to the terminal device in the RAN, core network, or in the cellular communication system, at least for the duration of its maintenance. In some embodiments described below, the identifier is called a durable UE identifier (DRUID), referring to the characteristics of maintaining the identifier even if the RRC connection is released.

The embodiments provide an advantage of maintaining parameters of one RRC connection to use when configuring operational parameters of a subsequent RRC connection. Accordingly, measurements or experiences gathered during an earlier RRC connection may be employed when configuring the subsequent RRC connection. As a result, performance improvement may be gained in terms of more efficient resource utilization and spectral efficiency, for example.

Figure 3:
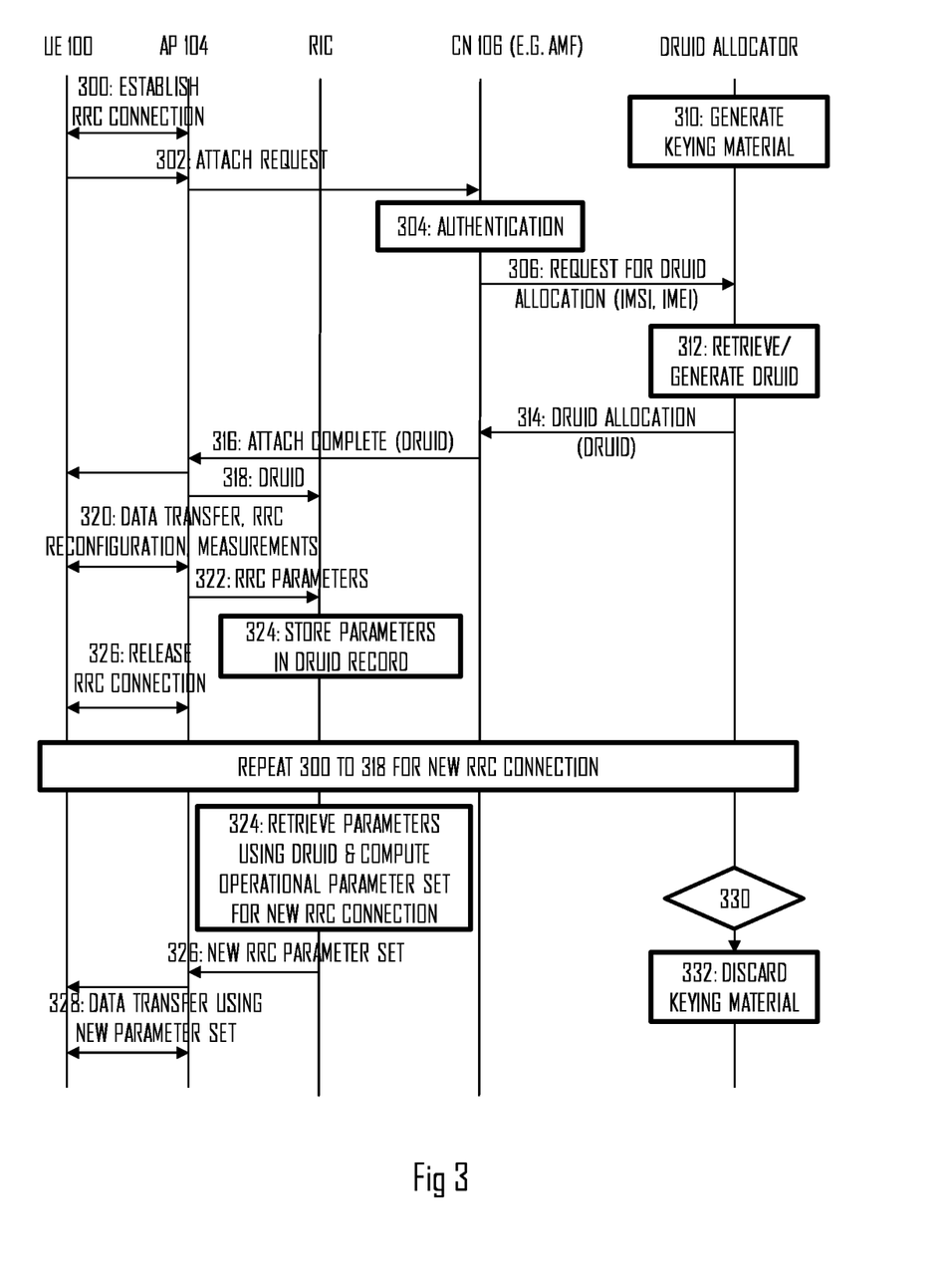
FIG. 3 illustrates a signalling diagram for acquiring an identifier for a terminal device and for storing and using parameters across multiple radio resource control connections linked to the identifier.

FIG. 3 illustrates an embodiment of a procedure for generating the DRUID and using the DRUID to store parameters of the terminal device over multiple RRC connections established for the terminal device. Referring to FIG. 3, the terminal device (UE) 100 and the access node (AP) 104 may establish a first RRC connection in step 300. The RRC connection may be established according to 3GPP specifications, for example. When the RRC connection has been established, the terminal device may transmit an attach request or a similar request requesting a connection to the core network 106. Upon receiving the attach request in step 302, the access node 104 may forward the access node to a network element of the core network, e.g. an access and mobility management function of a 5G network or a mobility management entity of the LTE network. The attach request may carry a subscriber identifier and/or an equipment identifier of the terminal device. An example of the subscriber identifier is an international mobile subscriber identifier (IMSI), and an example of the equipment identifier is an international mobile equipment identifier (IMEI) or a permanent equipment identifier (PEI). The network element may then authenticate the terminal device in block 304.

The network may comprise a DRUID allocator configured to generate the identifier described above in connection with FIG. 2. The DRUID Allocator may generate (block 310) new secure keying material K, if the time since the last update of the keying material is greater than the expiry time (specified by a network operator via a policy input, for example). The keying material K may be a random integer or bit-string or hexadecimal number of a determined length. The K need not be UE-specific. The K may have a time validity, based on the policy input provided by the operator, e.g. an expiry time after which the K should be refreshed. The DRUID Allocator may receive in step 306 a request for providing a DRUID for the UE 100. The request from the core network, e.g. the AMF, may contain information identifying the UE and optionally, a current location of the UE. The identification information may comprise the subscriber and/or the equipment identifier of the UE 100. As described herein, the request of step 306 may be transmitted/received upon a certain event such as the RRC connection establishment or the attach request, or may happen at any other suitable event. Another embodiment of requesting for the DRUID is in connection with a tracking area update where the UE 100 enters a new tracking area. The information on the current location of the UE can be e.g. a cell identifier or tracking area identifier. In block 312, the DRUID allocator checks based on the received identifier of the UE, whether or not a DRUID has already been allocated to the UE and, if so, retrieves the previously allocated DRUID. If no previously allocated DRUID is found in block 312, or if a time limit for the key material K used to generate the previous DRUID has expired, the DRUID allocator generates a new DRUID for the UE based on the UE identifier, the UE's current location identifier, and the current value of the keying material K. In an embodiment, the DRUID allocator allocates a new DRUID by using a secure hash function f( ) such as DRUID=$f$(UE identifier or previous DRUID,location info,$K$).

Use of such a secure hash function ensures that even if the DRUID becomes known to third party, the true identity of the UE cannot be inferred from the DRUID. The DRUID allocator may store the true identifier (e.g. the IMSI and/or IMEI) of the UE, the allocated DRUID, and the expiry time of the K used to allocate the DRUID, so as to enable retrieval and checking when a subsequent request is received (when 306 is executed for the same UE 100 the next time).

Upon generating the DRUID, the DRUID allocator may transmit (step 314) a response to the request received in step 306. The response may include the allocated DRUID. When the other attach procedures have been completed, the network element performing the attachment may forward the DRUID received in step 314 to the AP 104 in step 316, e.g. in an attach completed message. The AP may then forward the DRUID to a controller managing the database 210. In an embodiment, the controller is a radio intelligent controller defined in documentation for Open RAN (O-RAN). FIG. 1 illustrates the RIC in communication with the access node 104, and the RIC may have a corresponding communication link with other access nodes of the RAN. One function of the RIC is to provide intelligent radio resource management, procedure optimization, policy optimization in the RAN. It may provide the network nodes such as the AP(s) 104 guidance, parameters, policies and machine learning (ML) models. The RIC functions may include service and policy management, analysis of measured and observed behaviour in the RAN. Upon receiving the DRUID in step 318, if the DRUID is new to the RIC the RIC may generate a new record for the DRUID in the database. In step 320, the radio resource control connection may be configured with operational parameters e.g. via RRC reconfiguration procedures or other operational parameters at physical or MAC/RLC/PDCP layers, data is transferred between the UE 100 and the AP 104, and various measurements are made. Measurement data, configuration data, and other parameters of the RRC connection are also gathered by the AP and forwarded to the RIC in step 322, as the above-described first set of parameters. The DRUID may be provided in step 322 to identify the UE 100 to which the parameters belong. The RIC may then update the DRUID record with the received data (block 324). In step 326, the RRC connection is released. The release may mean that the AP releases the context of the UE and flushes all parameters from its memory. The parameters stored in the database may, however, be maintained by the RIC. The DRUID may also be maintained while other temporary identifiers of the UE may be released. The UE may enter an RRC idle state upon release of the RRC connection.

Upon determining to establish a new RRC connection for the UE 100, the steps 300 to 318 may repeated for the UE, as illustrated in FIG. 3. Let us assume that the new RRC connection is established while the DRUID is still alive and the RIC maintains the record for the DRUID. The lifetime of the DRUID may be defined by validity of the keying material, as described below. Upon receiving the DRUID in step 318, the RIC may access the record of the DRUID and retrieve any parameters stored therein (block 324) from earlier RRC connection(s). The RIC may then compute at least some of the operational parameters of the new RRC connection by using the parameters stored during the earlier RRC connection(s). Upon computing a RRC parameter set comprising the operational parameter(s), the RIC may send the RRC parameter set to the AP 104, and the AP 104 may configure the RRC connection by using the RRC parameter set. Then, data may be transferred over the new RRC connection by using thus configured RRC parameter set (step 328). Steps 320 to 324 may also be repeated and the database updated with parameters acquired during the new RRC connection.

In a similar manner, upon releasing the new RRC connection and thereafter establishing another new RRC connection for the UE, steps 300 to 318 and 324 to 328 may be repeated for the other new RRC connection. In this manner, the parameters stored in the database during several earlier RRC connection may be employed to configure a new RRC connection. The DRUID enables the identification of the parameters associated with the UE 100 over the multiple RRC connections.

In an embodiment, the DRUID allocator is provided in the core network 106. Each time the UE establishes an RRC connection, the RAN (e.g. the AP 104) may query the core network to obtain the DRUID for the UE. In order to reduce latencies, an alternative embodiment is to configure the RAN (e.g. the AP) to generate and provide the DRUID for the UE, encrypted by a RAN ciphering key such as K_RR-Cenc to improve security. When the UE 100 subsequently establishes another RRC connection, possibly with a new, different access node, the UE 100 may provide the DRUID back to the new access node, as ciphered using a new RRC ciphering key corresponding to the new access node. The new access node may then directly use the DRUID to look up the RAN-related data from previous RRC connections, without waiting for a query to the DRUID allocator in the core network. At a later point during the RRC connection, the new access node may query the core network to obtain the DRUID from the DRUID allocator. In case the old DRUID lifetime has expired, the access node may discontinue use of the old RAN-related data and generate a new DRUID. In this embodiment, the UE retains the DRUID between subsequent RRC connections.

In an embodiment, the above-described first set of parameters comprises at least one measured parameter of the first radio resource control connection. In other words, the parameters stored in the database comprise at least measured parameters of the (earlier) RRC connection(s).

In an embodiment, the DRUID has an expiry time, and the DRUID and the parameters stored in the record of the DRUID in the database are discarded upon expiry of the identifier. Referring to FIG. 3, upon determining in block 330 that the expiry time of the keying material and/or the DRUID has been reached, the DRUID allocator may discard the keying material and invalidate the DRUID. However, the invalidation may take place only when the DRUID allocates receives a subsequent request for DRUID allocation (step 306). Accordingly, if the DRUID is still in use in the AP 104 and the RIC, the DRUID may remain in use until the current RRC connection is released. As a consequence, abrupt policy changes to the RRC configuration may be avoided. The DRUID allocator may support a policy interface, by which a network operator can specify a policy regarding the expiration lifetime of keying material K used to allocate DRUIDs. When the lifetime of the keying material K expires (e.g. based on an expiry time specified by operator policy), the DRUID allocator may generate new keying material and discard the old keying material. From this point on, the DRUID allocator may allocate new DRUIDs even to UEs that have received DRUIDs. Accordingly, the new DRUID for a given UE, generated with the new keying material, can no longer match the DRUID earlier allocated to the UE. In an embodiment, the lifetime of the keying material or the DRUID is counted in a determined number of days, e.g. seven days, allowing a sizeable time window to make inferences improving the performance of the RRC connections. From another perspective, the operator may set the lifetime shorter, e.g. one day, to limit an impact of a security breach where the DRUID is revealed to a third party. Even in such a case, the duration is long enough that it can easily cover several RRC connections of the UE.

In an embodiment, the database is stored in a radio access network of the cellular communication system.

In an embodiment, an interface used in steps 318, 322, and 326 between the AP 104 and the RIC is an E2 interface of Open Radio Access Network (O-RAN) specifications.

Figure 4:
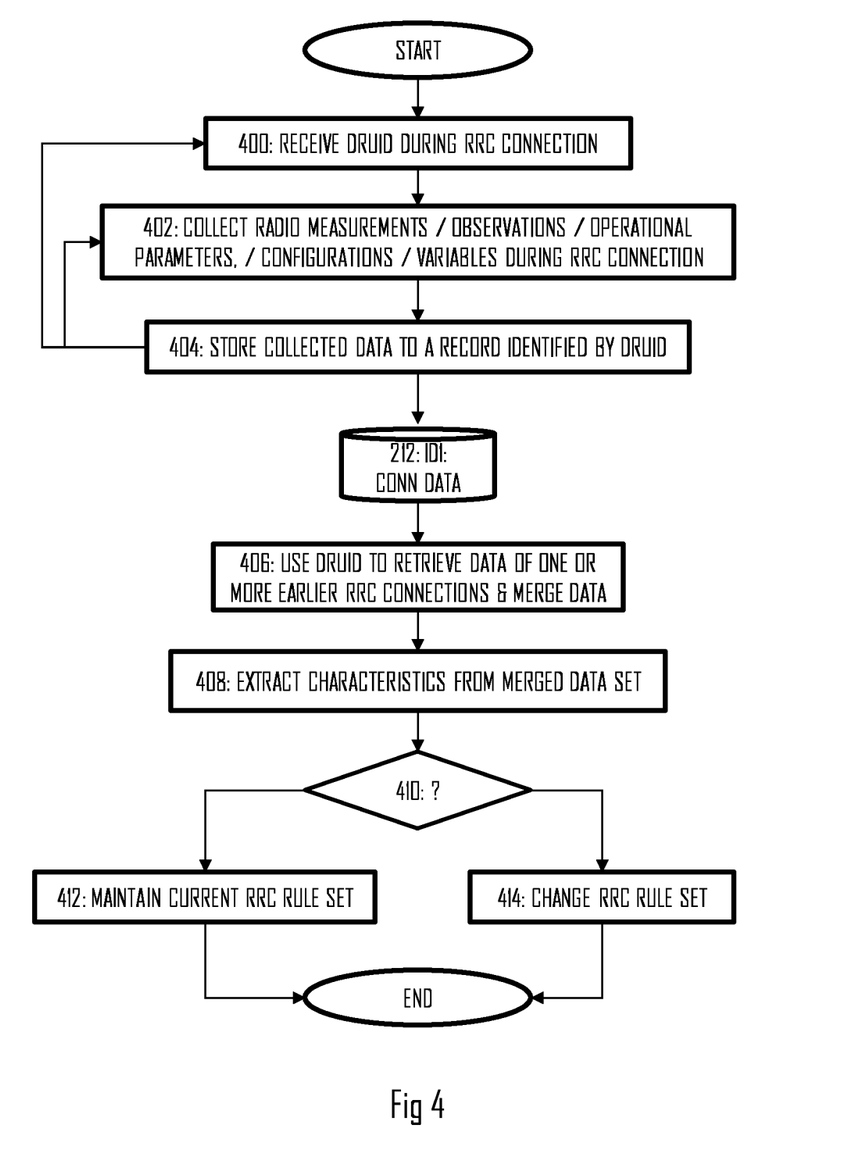
FIG. 4 illustrates a procedure combining the acquisition of parameters of a radio resource control connection and use of the acquired parameters and parameters of earlier connections in modifying rules for selecting operational parameters of the connection.

The procedure of FIG. 3 can be summarized as follows and as illustrated in FIG. 4. The apparatus or system performing the procedure of FIG. 2 may acquire at least one of a subscriber identifier and an equipment identifier of the terminal device in connection with the first radio resource control connection; transmit a request message to an identifier allocator, the request message comprising the at least one of the subscriber identifier and the equipment identifier; receive (block 400), from the identifier allocator, a response message comprising the identifier of the terminal device; and store (block 404), during the first radio resource control connection, measurement data in the database by using the identifier. The measurement data may be acquired in block 402. Additionally, or alternatively, the parameters stored to the database may include operational parameters of the RRC connection, configurations of the RRC connection, performance metrics of the RRC connection, or other variables of the RRC connection. In an embodiment, the parameters comprise a configuration of the RRC connection and measured parameters of the connection as linked to the configuration. Accordingly, the database may store selected configurations and respective performance of the selected configurations and, thus, help in determining whether or not to follow the same decisions or configuration of operational parameters for subsequent RRC connections.

The bottom half of FIG. 4 illustrates an embodiment of block 202 and 204 or 324. In the embodiment, the AP and/or RIC may store a default mapping or default values of an operational parameter of the at least one operational parameter. The default mapping may be understood as selecting a default operational parameter (set) for certain measured or observed conditions of the RRC connection. From another perspective, the default mapping may be understood as selecting a default operational parameter (set) for a UE's RRC connection when no further information is available, for example when no further information or measurements from previous connections of the UE have been recorded. For example, a certain modulation and coding scheme may be selected when measured channel state information of a radio channel of the RRC connection indicates certain channel conditions. From another perspective, a certain modulation and coding scheme may be selected as an initial value for uplink/downlink transmissions when a new RRC connection is set up, when typically no information about the UE's current channel conditions is available. Typically, the default values will be applied to all UEs, and are thus typically not UE-specific. The same applies to other operational parameters such as a rank of the channel (or an upper limit on the allowed rank), transmit power control setting, operational parameters of a hybrid automatic repeat request (HARQ) procedure such as the maximum number of HARQ processes, etc. With the information from the earlier RRC connection, as represented by the first set of parameters stored in the database, the default mapping or default values may be changed to a new mapping or new (set of) values for the operational parameters of the new RRC connection, providing more efficient or more optimized values for the operational parameters. Since the earlier RRC connection(s) may have unique parameters that depend on measurements or experiences of the UE, gathered during the earlier RRC connection(s), the change may also cause the new mapping to be unique to the UE 100 amongst a set of terminal devices. The set of terminal devices may comprise a set of terminal devices served by a given access node, a subset of all the terminal device served by the access node, all the terminal devices served by the access node, a subset of or all the terminal devices of the RAN, or another terminal devices.

Referring to FIG. 4, the DRUID acquired for the new RRC connection may be used to acquire or retrieve the data (parameters) stored in the database during one or more earlier RRC connections using the same DRUID (block 406). Upon acquiring the data from the database, the data may be merged to a common data set. Merging may include removing the information identifying a RRC connection to which each data belongs. In block 408, characteristics or features are extracted from the common data set. Machine learning or statistical analysis may be applied to the common data set to extract the characteristics. Block 408 may comprise finding correlations between selected operational parameters, measured conditions, and measured performance gained using the selected operational parameters that were used during the earlier RRC connections. In block 410, it is determined whether or not the observed characteristics imply that a default rule set or default mapping or default value(s) for selecting the operational parameters should be changed. Upon determining that the characteristics indicate potential for performance improvement by changing the default rule set or default mapping or values, the process may proceed to block 414 where a new rule set for selecting the operational parameters for the new RRC connection is derived based on the retrieved parameters of the earlier RRC connection(s). Otherwise, the procedure may proceed to block 414 where the default rule set is maintained. More detailed embodiments of blocks 408 to 414 are described below.

The upper part and the lower part of FIG. 4 may be carried out concurrently and in parallel. In other words, the new parameters may be stored in the database during the RRC connection. Meanwhile, when the parameters in the database have changed, the lower part of FIG. 4 may be carried out in order to determine whether or not to change the rule set that defines a policy for selecting the operational parameters. Upon changing the rule set in block 414, the performance of the new rule set may be measured in the upper part of FIG. 4 to acquire new measurement data for another iteration of blocks 406 to 414. In this manner, the algorithm may learn consequences of the changes, enforce changes that improved the performance, and avoid repeating poor changes that degrade the performance.

The embodiments described herein enable learning a UE's radio behaviors/characteristics across multiple RRC connections of the UE, and using the learnings to make modifications to radio resource management (RRM) algorithms and RRC parameters applied to the RRC connections. For example, the UE may make a connection in a given cell multiple times over the course of a day or several days. While each RRC connection is different, the UE will typically have some common characteristics across all (or most) connections. These are the patterns that can be learned and used for modifying the RRM algorithms applied to that UE. The radio behaviors/characteristics that are of interest and learned are typically implementation-dependent aspects that could be different and unique to each UE. Functionally, each UE may perform the same functions, as standardized within 3GPP. In terms of standardized verification tests under laboratory conditions, the UEs may all pass the qualification criteria. However the performance characteristics of a given UE in the field conditions may exhibit significant differences from other UEs. These are the characteristics that are of interest in the described embodiments. By having the ability to correlate different RRC connections of the same UE, one can observe and store measurements and observations from the same UE across many RRC connections, and thereby build a set of measurements and observations for the same UE. Many patterns and characteristics, which would otherwise not have been easily detectable, can be learned from observing such a set of measurements and observations. Such learning allows modification of RRM algorithms and operational parameters that are applied to each individual UE.

Figure 5:
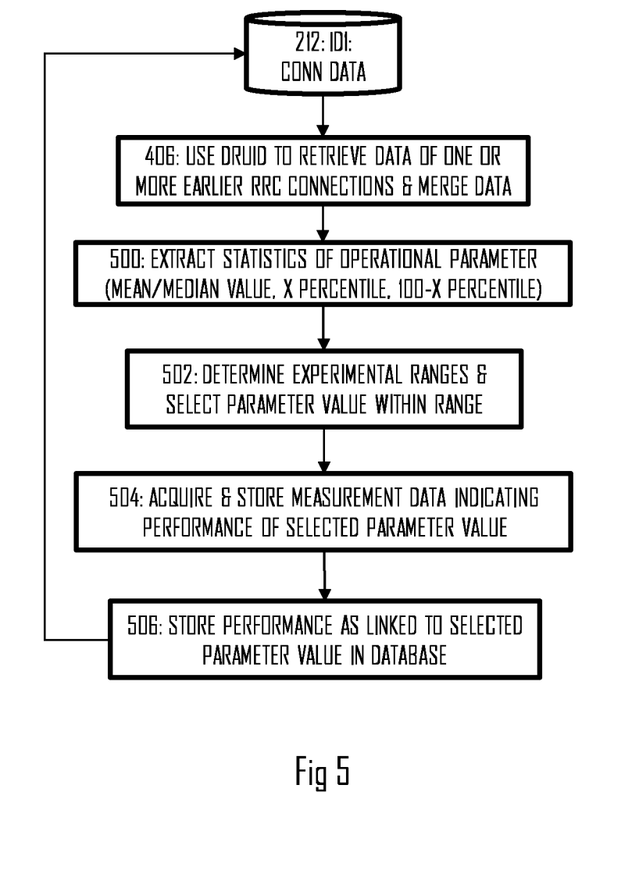
FIGS. 5 and 6 illustrate embodiments of processes for using parameters of earlier connections in configuring operational parameter(s) of a current connection.

In an embodiment, the RIC or another network element determining an operational parameter for the RRC connection according to the embodiments of FIG. 2 determines an operational range for the operational parameter on the basis of the parameters (connection data in Figures) stored in the database 212 of the UE. The operational range may define ranges within which the value of the operational parameter is allowed to vary. Then, the network element may vary the operational parameter within that range in block 204 or 324, for example. FIG. 5 illustrates such an embodiment.

Referring to FIG. 5, block 406 may be carried out in the above-described manner to retrieve the data/parameters of the previous RRC connection(s) stored in the UE record 212 identified by the DRUID (ID1 in the Figures). Upon acquiring the data of the previous RRC connection(s), statistics of a given operational parameters may be extracted from the data in block 500. The statistics may include, a mean value or a median value of the operational parameter, a determined low percentile (e.g. $5^{th}$ percentile) and a determined high percentile (e.g. $95^{th}$ percentile) of the operational parameter, etc. Then, the operational range may be determined to be the range between the low percentile and the high percentile, and an initial value for the operational parameters may be selected to be the mean/median value of the operational parameter (block 502). Upon selecting the value for the operational parameter, performance achieved by using the selected parameter value may be measured and stored in the record (blocks 504 and 506). Thereafter, the network element may change the value of the operational parameter within the allowed ranges in order to perform experiments and/or as a result of observed changes in the conditions of the RRC connection. The effect of such changes to the performance may again be measured and stored in the record to help with the following selections of the operational parameter.

The operational parameter may be, for example, a modulation and coding scheme (MCS). In real operation, there can be a mismatch between the channel state information (CSI) or channel quality information (CQI) indicating conditions of a radio channel of the RRC connection and reported by the UE and the "true" channel conditions for that UE. The CSI or CQI reported by the UE maps to an "ideal" MCS, and under ideal conditions there should be no need for any adjustment. However, in practice the UE's CQI reporting does not necessarily reflect the "true" channel conditions that would lead to the selection of the most optimal MCS for that situation. The UE implementation may use a channel estimation algorithm and a link curve table which translates an estimated signal-to-noise ratio (SINR) to an estimate of an achievable spectral efficiency. This link curve is typically developed/validated by a manufacturer/designer of the UE under certain conditions, e.g. assuming a specific fading model such as Rayleigh fading. However, in practice in the field the fading profile in any given cell may be different from the idealized assumptions. Due to this, there will be a mismatch in the link curve assumed by the UE implementation and the "true" link curve for that UE. This mismatch may further depend on the inherent inaccuracies in the UE's underlying channel estimation algorithm, which may thus vary from UE to UE.

Similar characteristic can be observed in a channel rank (a number of uncorrelated spatial communication channels or layers between the UE and the AP). Typically UE will report the rank of the channel relative to (beamformed) reference signals that the APs transmit. Due to channel estimation errors or due to inherent differences in energy between different spatial layers, the UE may report an inaccurate rank at which transmission is not actually sustainable. When the AP detects increase in an error rate, it may first try to change to a more reliable MCS and, eventually, also try to reduce the rank. This may be a relatively slow process and, meantime, the UE may experience reduced throughput. Such a mismatch in the reported and true channel rank may be a systematic error that is exhibited by the UE time after time. By observing the occurrence of this for a given UE over successive RRC connections, it is possible to detect a pattern and correct it with appropriate modifications to the RRM algorithms. For example, the AP is enabled to pre-emptively reduce the channel rank for the UE, and the UE may experience more stable throughput that is protected from the potential instability at higher rank.

Further similar characteristic may be observed with HARQ procedures. 5G allows up to 16 HARQ processes to be simultaneously used. However, depending on the UE implementation, a UE may experience throughput degradation as more and more HARQ processes are taken into use. For example, different HARQ processes may share the same memory buffers at the UE. Due to memory limits, a UE may not be able to simultaneously retain data of all HARQ processes in the buffer. Once the memory limits are exceeded, the UE may have to discard some data, resulting in poorer HARQ performance, e.g. loss of incremental redundancy data. This effect may be quite hard to detect in the field. But by detecting that for a given UE the performance has been observed (in previous RRC connections) to degrade upon increasing the number of HARQ processes, the number of HARQ processes used for the UE may be limited a maximum value. Such a maximum value may be determined in block 502, for example.

Yet another similar characteristic may be observed in connection with dual connectivity or multi-connectivity where the UE adds a new logical link with the same AP or with different AP (a secondary AP). There may be defined a threshold for establishing a new logical link. Setting a common threshold for all UEs may not be optimal because some UEs may not be capable of operating the multi-connectivity in the same manner. Each UE may have a unique threshold when the addition or deletion of a further logical link is triggered. Some embodiments may be used to customize this threshold for the UE by observing the behavior over multiple RRC connection.

Due to the above-described features, there is often a systematic bias or mismatch between the "true" conditions for any UE and the actual reported conditions. Thus, the MCS or another operational parameter as predicted based on just the reported conditions would be either too pessimistic or too optimistic. The described embodiments aim to correct for this mismatch.

Figure 6:
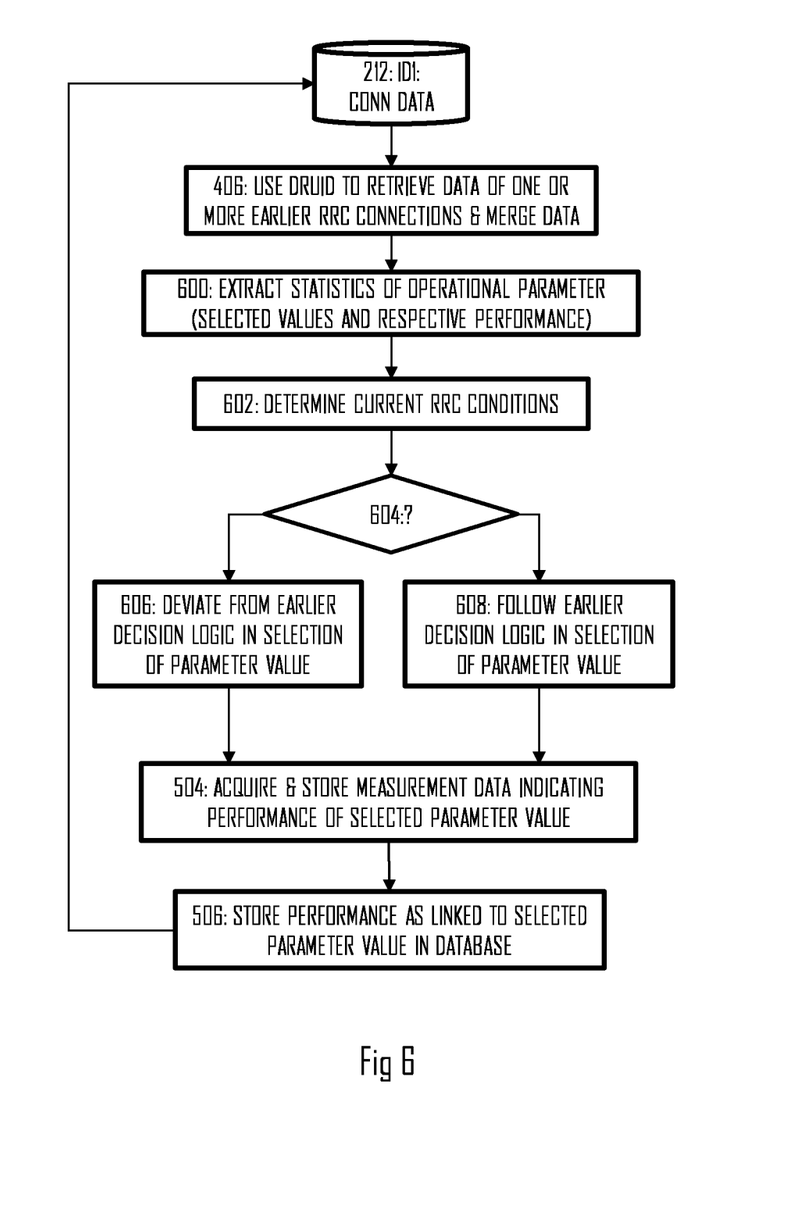

FIG. 6 illustrates a procedure for flexible adaptation of a decision logic applied to the RRC connection of the UE 100. The procedure of FIG. 6 may be carried out for selecting a certain operational parameter, e.g. the MCS, the (maximum) number of HARQ processes, or the channel rank. Again, block 406 may be carried out and data stored in the record of the DRUID is retrieved. The retrieved data may be stored as related to the certain operational parameter, such as previously selected values of the operational parameter, under which conditions the selections have been made, and measured performances. In block 600, the data is analysed. The analysis may include acquiring statistical characteristics of the data, analysis of behaviour of the performance as a function of the value of the operational parameter and/or as a function of the conditions, etc. In block 602, the current conditions are determined, e.g. as reported by the UE and/or as measured by the AP. For example, if the operational parameter is the MCS, the conditions may include the CSI/CQI. If the operational parameter is the channel rank, the conditions may include a measured rank indicator.

In block 604, a decision is made whether to maintain the current selection logic for selecting the value of the operational parameter on the basis of the reported RRC conditions. If it is determined that the analysis performed in block 602 supports the current decision logic (rule set), the process may proceed to block 608 where a value of the operational parameter is selected on the basis of the RRC conditions determined in block 602 and the current decision logic. However, if it is determined that the analysis supports deviation from the decision logic, the process may proceed to block 606 where the decision logic is either changed or that the value of the operational parameter is selected against the current selection logic. For example, if the conditions indicate an increased channel rank and the current selection logic would result in increasing the number of spatial layers but that the analysis indicates that the past measurements and observations indicate that the resulting value of the channel rank has shown to degrade the overall performance of the UE or the RRC connection, it may be determined not to increase the number of spatial layers. In a similar manner, if the conditions indicate addition of a new HARQ process or a new logical link for the UE but that the analysis indicates that the addition has earlier actually degraded the performance, the change may be omitted.

In an embodiment, the network element performing the procedure may proceed to block 606 even if the analysis would indicate proceeding to block 608. The network element may determine to experiment by intentionally deviating from the selection logic to see whether or not the deviation would improve the performance. So even if the analysis suggests that the decision logic is valid and up to date, the network element may randomly deviate from it.

When selecting a value for the operational parameter, blocks 504 and 506 may be performed to measure and store the effect of the selected value. Accordingly, the new measurement data is available when the value of the operational parameter is selected the next time and for next RRC connections.

For example, when the procedure of FIG. 6 is carried out for selecting the number of parallel HARQ processes, the analysis in block 600 may include computing an average number of retransmissions per number of parallel HARQ processes. If the analysis indicates that the average number of retransmissions rises more than a determined threshold level after the number of parallel HARQ processes reaches a certain number, that certain number may be selected as the maximum number of HARQ processes. Now, if the conditions determined in block 602 indicate that the number of parallel HARQ processes should be selected to be higher than the maximum number (according to the current decision logic), the procedure may proceed to block 606 and the maximum number of parallel HARQ processes may be selected.

As another example, let us consider a case where the operational parameter is a threshold used for triggering addition of a new logical radio link. The analysis may indicate that upon adding a new logical radio link, measured channel conditions suddenly drop and this is a systematic characteristic, as deemed in block 600. A reason may be that the receiver sensitivity in the UE changes when a new link is added. If the analysis indicates that adding the new link with a default value (according to the current decision logic) will result in degraded channel conditions, the procedure may proceed to block 606 where the value of the threshold is changed. The change may be to the direction that raises the bar for adding the new link, e.g. adding the new link requires better channel conditions than required by the default value of the threshold.

From a perspective, the embodiments of FIGS. 5 and 6 may be considered as a procedure for offsetting the default value of the operational parameter that would be selected, if the default decision logic or default rule set would be followed. The default decision logic or the default rule set may be understood as the policy that is applied to multiple UEs or all UEs in the same manner initially. The embodiments described above may thus be used as means for providing a UE-specific decision logic or rule set that is realized on the basis of measured and/or observed behaviour during the past RRC connections of each UE. The degree of such offset may be non-zero but there may be times when the procedure finds the default value(s) of the operational parameter(s) to be appropriate.

Figure 7:
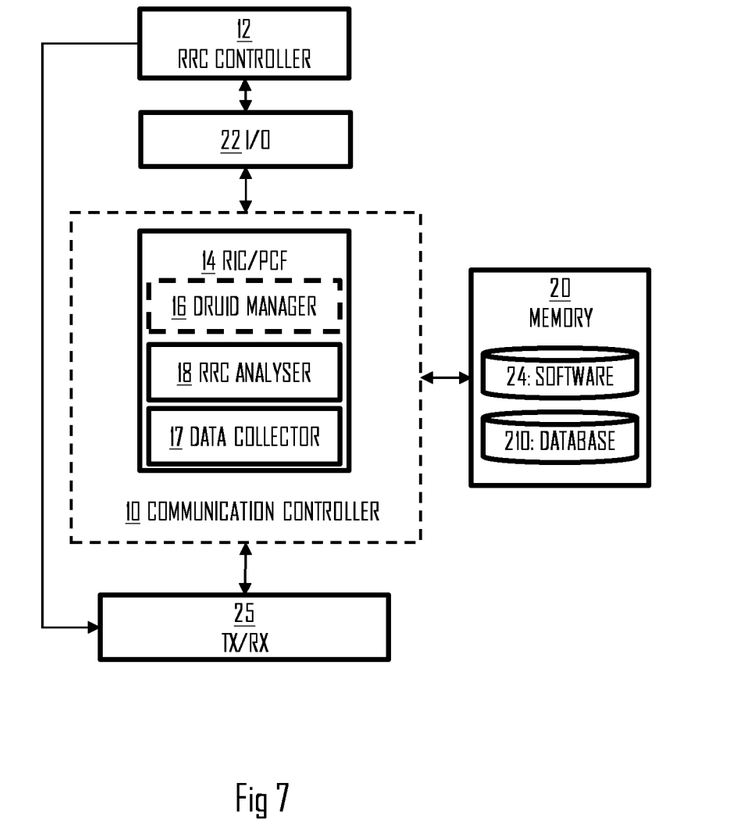
FIG. 7 illustrates a block diagram of a structure of an apparatus according to an embodiment.

FIG. 7 illustrates an embodiment of a structure of the above-mentioned functionalities of an apparatus or a system executing the functions of the network element or a network system in the embodiments described above, e.g. the process of FIG. 2 or any one of embodiments thereof. As described above, the apparatus for the network element(s) may be configured to perform the selection of operational parameters of RRC connections for terminal devices, e.g. the terminal device 100 described above. In an embodiment, the apparatus may comprise at least one circuitry or at least one electronic device realizing some embodiments of the invention in the network element(s). The apparatus carrying out the above-described functionalities may thus be comprised in such a device, e.g. the apparatus may comprise a circuitry such as a chip, a chipset, a processor, a micro controller, or a combination of such circuitries for the network element(s).

Referring to FIG. 7, the apparatus may comprise a communication controller 10 providing the apparatus with capability of performing the above-described functions of the network element(s). In some embodiments where the apparatus is implemented in the access node, e.g. the AP 104, the apparatus may comprise a radio interface 25 providing the apparatus with radio communication capability, and the communication controller 10 may employ the radio interface 25. The radio interface 25 may enable wireless communications with terminal devices served by the network element. The radio interface 25 may comprise multiple antennas and associated analogue components needed for transmitting and receiving radio signals, e.g. an amplifier, filter, frequency-converter, and an analogue-to-digital converter. The communication controller 10 and/or the radio interface 25 may comprise a radio modem configured to carry out transmission and reception of messages in the cellular network. In some embodiments, the radio interface is used for communicating with the other network elements, e.g. other access nodes.

In some embodiments, the apparatus comprises a second communication interface 22 configured to provide the apparatus with capability of communicating towards the core network 110 and/or towards network elements of the RAN. The apparatus may then comprise the radio interface 25 or be without the radio interface 25. In some embodiments, the communication interface 22 may also be used to communicate with the other network nodes via wired connections.

The communication controller 10 may comprise at least one processor or a processing circuitry. The apparatus may further comprise a memory 20 storing one or more computer program products 24 configuring the operation of said processor(s) of the apparatus. The memory 20 may be implemented using any suitable data storage technology, such as semiconductor-based memory devices, flash memory, magnetic memory devices and systems, optical memory devices and systems, fixed memory and removable memory. The memory 20 may further store the database 210 storing the above-described parameters/data of the RRC connections of the terminal devices.

In embodiments where the apparatus is for the access node, the communication controller may comprise an RRC controller 12 configured to establish, operate, and terminate RRC connections between the network node and the terminal devices connected to the network node. The RRC controller 12 may implement the configurations of the RRC connections and also changes to the operational parameters of the RRC connections. In some embodiments, the RRC controller may also have a measurement function to measure the performance of the RRC connections and/or acquire measurement data related to the RRC connections. In embodiments where the apparatus is external to the access node, the RRC controller may also be external to the apparatus, as illustrated in FIG. 7.

As described above, the apparatus or system of FIG. 7 may be comprised in the radio intelligent controller (RIC) or in a policy control function (PCF). The PCF is defined in the 3GPP specifications of the 5G system for performing functions such as provision of policy rules for control plane functions of connections, including the RRC connections. LTE systems have a similar network element. The RIC, PCF, or a similar network element implementing the embodiments described above may comprise an RRC analyser circuitry 18 configured to execute blocks 202 and 204 or any one of their embodiments, e.g. block 324, blocks 406 to 414, or the embodiment of FIG. 5 or 6, as described above. Upon performing the analysis and selecting the operational parameter(s) for a RRC connection of a terminal device, the RRC analyser may output the selection to the RRC controller 12 for implementation. The RIC/PCF etc. 14 may further comprise a data collector 17 configured to acquire the data/parameters during the RRC connection and store the acquired data/parameters in the respective record identified by the DRUID of the database 210. The data collector may thus perform at least blocks 200, 324, or 400 to 404, depending on the embodiment.

The RIC/PCF etc. may further comprise in some embodiments a DRUID manager that manager the database on the basis of the validity of the DRUID or a respective identifier used in the described embodiments. For example, upon detecting that a DRUID of a terminal device has expired, e.g. upon receiving no new data for a given DRUID record within a determined time interval or upon receiving explicit information on the expiry of the DRUID, the DRUID manager may discard the record of the DRUID in the database 210. Additionally, upon detecting a new DRUID, the DRUID manager may establish a new record for the DRUID in the database.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in connection with FIG. 2 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. A system, comprising:
   at least one processor; and
   at least one memory including computer program code, wherein the at least one memory and computer program code are configured, with the at least one processor, to cause the apparatus to perform the following:
   storing, in a database, an identifier of a terminal device and a first set of parameters of a first radio resource control connection of a terminal device wherein the first set of parameters comprises at least one measured parameter of the first radio resource control connection;
   retrieving, from the database by using the identifier after the first radio resource control connection has been terminated, the at least one measured parameter of the first radio resource control connection;
   configuring, on the basis of the retrieved at least one measured parameter of the first radio resource control connection, at least one operational parameter of a second radio resource control connection of the terminal device identified by the identifier;
   storing a default mapping between values of an operational parameter of the at least one operational parameter and conditions of a radio resource control connection; and
   changing, on the basis of the first set of parameters, the default mapping for the second radio resource control connection, wherein the change causes the mapping to be unique to the terminal device amongst a set of terminal devices served by an access node.

2. The system of claim 1, wherein the identifier of the terminal device is a persistent identifier maintained across at least the first radio resource control connection and the second radio resource control connection in the database.

3. The system of claim 1, wherein the identifier has an expiry time, and wherein the at least one memory and computer program code are configured, with the at least one processor, to cause the apparatus to discard the identifier and the first set of parameters upon expiry of the identifier.

4. The system of claim 1, wherein the at least one memory and computer program code are configured, with the at least one processor, to cause the apparatus to store the database in a radio access network of a cellular communication system.

5. The system of claim 1, wherein the at least one memory and computer program code are configured, with the at least one processor, to cause the apparatus to:
- acquire at least one of a subscriber identifier and an equipment identifier of the terminal device in connection with the first radio resource control connection,
- transmit a request message to an identifier allocator, the request message comprising the at least one of the subscriber identifier and the equipment identifier;
- receive, from the identifier allocator, a response message comprising the identifier of the terminal device; and
- store, during the first radio resource control connection, measurement data in the database by using the identifier.

6. The system of claim 5, wherein the at least one memory and computer program code are configured, with the at least one processor, to cause the apparatus to:
- acquire the at least one of the subscriber identifier and the equipment identifier of the terminal device in connection with second first radio resource control connection,
- transmit a further request message to the identifier allocator, the further request message comprising the at least one of the subscriber identifier and the equipment identifier;
- receive, from the identifier allocator, a further response message comprising the identifier of the terminal device; and
- store, during the second radio resource control connection, measurement data in the database by using the identifier.

7. A method, comprising:
- storing, in a database, an identifier of a terminal device and a first set of parameters of a first radio resource control connection of a terminal device wherein the first set of parameters comprises at least one measured parameter of the first radio resource control connection;
- retrieving, by a network element from the database by using the identifier after the first radio resource control connection has been terminated, the at least one measured parameter of the first radio resource control connection;
- configuring, by the network element on the basis of the retrieved at least one parameter of the first radio resource control connection, at least one operational parameter of a second radio resource control connection of the terminal device identified by the identifier;
- storing a default mapping between values of an operational parameter of the at least one operational parameter and conditions of a radio resource control connection; and
- changing, on the basis of the first set of parameters, the default mapping for the second radio resource control connection, wherein the change causes the mapping to be unique to the terminal device amongst a set of terminal devices served by an access node.

8. The method of claim 7, wherein the identifier has an expiry time, and wherein the at least one memory and computer program code are configured, with the at least one processor, to cause the apparatus to discard the identifier and the first set of parameters upon expiry of the identifier.

9. The method of claim 7, wherein the database is stored in a radio access network of a cellular communication system.

10. The method claim 7, further comprising:
- acquiring at least one of a subscriber identifier and an equipment identifier of the terminal device in connection with the first radio resource control connection,
- transmitting a request message to an identifier allocator, the request message comprising the at least one of the subscriber identifier and the equipment identifier;
- receiving, from the identifier allocator, a response message comprising the identifier of the terminal device; and
- storing, during the first radio resource control connection, measurement data in the database by using the identifier.

11. The method of claim 10, wherein the at least one of the subscriber identifier and the equipment identifier of the terminal device is acquired in connection with second first radio resource control connection, the method further comprising
- transmitting a further request message to the identifier allocator, the further request message comprising the at least one of the subscriber identifier and the equipment identifier;
- receiving, from the identifier allocator, a further response message comprising the identifier of the terminal device; and
- storing, during the second radio resource control connection, measurement data in the database by using the identifier.

12. A computer program product embodied on a non-transitory computer-readable medium and comprising a computer program code readable by a computer, wherein the computer program code configures the computer to carry out a computer process comprising:
- storing, in a database, an identifier of a terminal device and a first set of parameters of a first radio resource control connection of a terminal device wherein the first set of parameters comprises at least one measured parameter of the first radio resource control connection;
- retrieving, from the database by using the identifier after the first radio resource control connection has been terminated, the at least one measured parameter of the first radio resource control connection;
- configuring, on the basis of the retrieved at least one parameter of the first radio resource control connection, at least one operational parameter of a second radio resource control connection of the terminal device identified by the identifier;
- storing a default mapping between values of an operational parameter of the at least one operational parameter and conditions of a radio resource control connection; and
- changing, on the basis of the first set of parameters, the default mapping for the second radio resource control connection, wherein the change causes the mapping to be unique to the terminal device amongst a set of terminal devices served by an access node.

* * * * *